No. 633,057. Patented Sept. 12, 1899.
J. WALTER.
CARBONATING APPARATUS.
(Application filed Dec. 24, 1898.)
(No Model.)
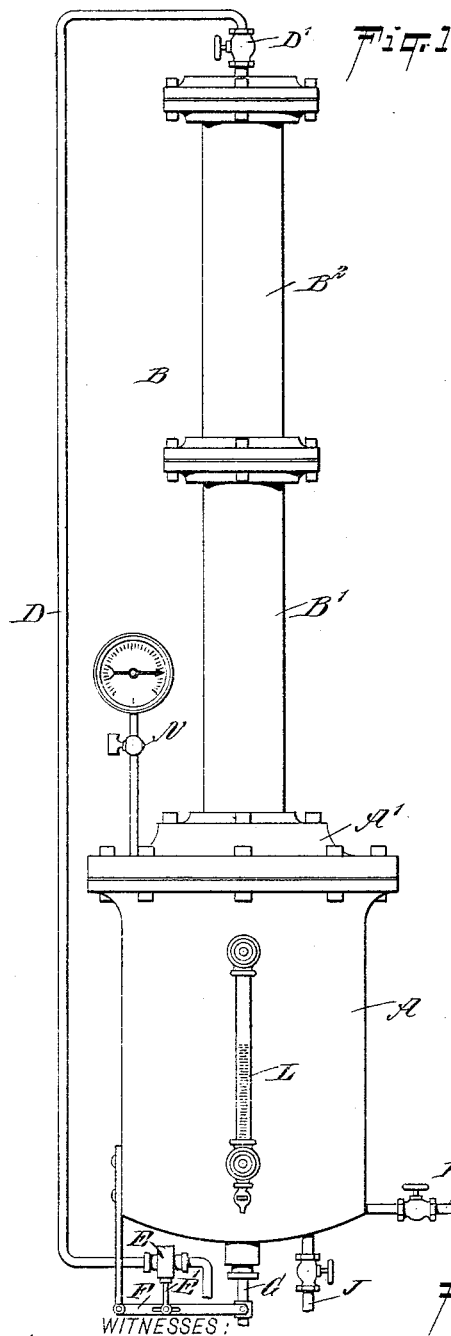
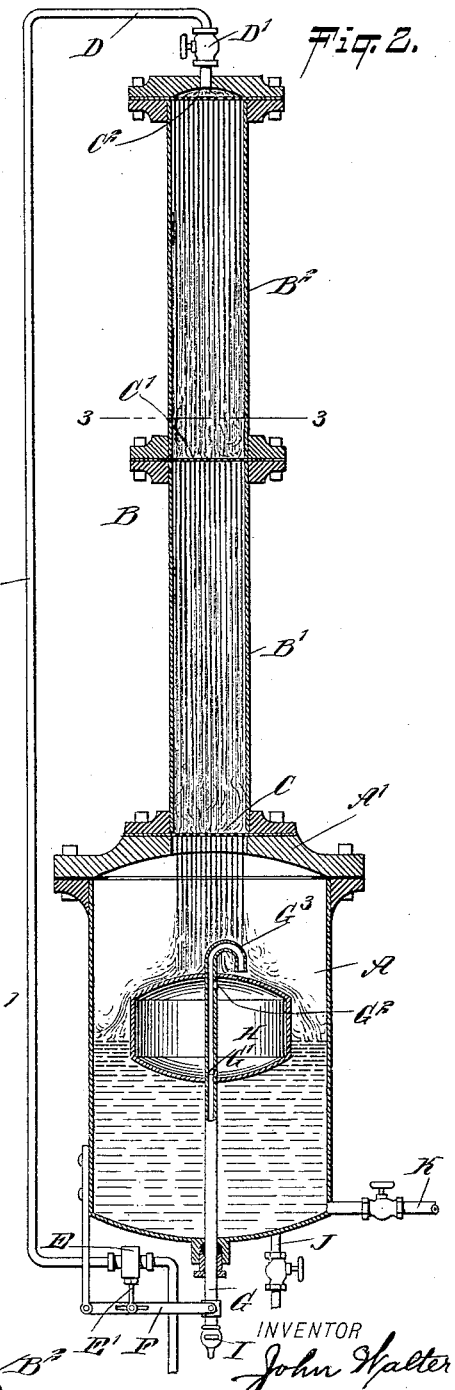
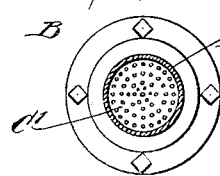
WITNESSES:
INVENTOR
John Walter.
BY
ATTORNEYS.

UNITED STATES PATENT OFFICE.

JOHN WALTER, OF SAVANNA, ILLINOIS.

CARBONATING APPARATUS.

SPECIFICATION forming part of Letters Patent No. 633,057, dated September 12, 1899.

Application filed December 24, 1898. Serial No. 700,257. (No model.)

*To all whom it may concern:*

Be it known that I, JOHN WALTER, of Savanna, in the county of Carroll and State of Illinois, have invented a new and Improved Carbonating Apparatus, of which the following is a full, clear, and exact description.

The object of the invention is to provide a new and improved carbonating apparatus more especially designed for carbonating mineral waters and other liquids in a very simple and effective manner.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a side elevation of the improvement. Fig. 2 is a sectional side elevation of the same, and Fig. 3 is a sectional plan view of part of the same on the line 3 3 in Fig. 2.

The improved carbonating apparatus is provided with a vessel A, made of suitable material and closed at the top by a cover $A'$, on which is set a stand-pipe B, made in sections $B'$ $B^2$, securely bolted together, the lower end of the section $B'$ being bolted to the cover $A'$. A perforated disk C is arranged in the lower end of the stand-pipe at the junction of the section $B'$ with the cover $A'$, and a similar perforated disk $C'$ is arranged in the joint between the two sections $B'$ $B^2$, and another perforated disk $C^2$ is arranged in the upper closed end of the section $B^2$, as is plainly illustrated in Fig. 2. A pipe D opens into the top of the stand-pipe B, above the upper disk $C^2$, and this pipe is connected with a supply of the liquid to be carbonated, said pipe being provided with a stop-cock $D'$ near its upper end and with a regulating-valve E, arranged below the vessel A, as is plainly indicated in the drawings. The stem $E'$ of the regulating-valve E is connected with a lever F, fulcrumed on a bracket carried by the vessel A, the free end of the lever having a pivotal connection with the lower end of a hollow stem G, extending through a stuffing-box in the bottom of the vessel A, to extend within the latter and connect at its upper bent end to the top of a float H, adapted to rise and fall with the liquid in said vessel A.

The hollow stem G is provided within the float with a drain-opening $G'$ and a gas-inlet opening $G^2$, and the upper end of the stem extends through the top of the float and is formed into a return-bend $G^3$, terminating near the top of the float. Now by way of the return-bend $G^3$ and the opening $G^2$ carbonic-acid gas can pass from the vessel A to the interior of the float to equalize the pressure on the inside and outside of the float to render the float non-collapsible. The drain-opening $G'$ permits any water accidentally passing into the float to drain into the stem G, from which the water is discharged from time to time by opening a stop-cock I on the lower outer end of said stem. The bend $G^3$ prevents the dropping water from splashing into the float.

The vessel A is provided near its lower end with a valved pipe J, connected with a carbonic-acid-gas supply, and a valved pipe K leads from the lower end of said vessel to draw off the carbonated liquid from the vessel. The vessel is further provided with a gage L for indicating the amount of liquid contained in the vessel and with a gage N for indicating the pressure of gas in the vessel.

The operation is as follows: When the several parts are in the position shown in the drawings, the valves E and $D'$ are open to permit the water or other liquid to be carbonated to flow through the pipe D into the top of the stand-pipe and be divided upon passing through the perforations in the disk $C^2$ and to drop in this divided condition to the next disk $C'$, so as to be again divided and dropped to the next or bottom disk C for further division and for passing in a divided state into the interior of the vessel A. The gas supplied to the vessel through the pipe J rises through the perforations in the disks C $C'$, so as to pass into the stand-pipe and be readily taken up by the liquid as the latter descends in a divided state, so that the liquid finally passing into the vessel A is thoroughly carbonated, it being understood that the liquid also takes up gas in the vessel, especially as it drops upon the float H and is sprayed by the same before coming to a rest in the vessel. The float rises and falls with the accumulating carbonated liquid, and in rising the stem G swings the lever F upward to close the valve E and shut off the liquid-supply. The carbonated liquid is withdrawn from the vessel A by means of the pipe K and is filled into suitable bottles or other receptacles, and as the carbonated liquid decreases in amount in the vessel the float H sinks and finally opens the valve E to admit more liquid to the stand-pipe. The above-described operation is then repeated—that is, the incoming liquid is minutely divided, so as to readily take up the carbonic-acid gas rising into the stand-pipe from the vessel A, as above explained.

By providing a bend in the upper end of the stem G the float H is prevented from filling with water or other liquid, and in case of accidental filling the liquid readily drains out of the float by way of the opening G'.

Having thus fully described my invention, I claim as new and desire to secure by Letters Patent—

1. A carbonating apparatus, comprising a receptacle provided with an inlet for the liquid to be carbonated, a float located in said vessel, a liquid-supply valve controlled by said float, and a pipe extending through the float and provided with openings in the upper and lower portion of the float, to fill the same with gas and drain the liquid therefrom respectively.

2. A carbonating apparatus, comprising a receptacle provided with an inlet for the liquid to be carbonated, a float located in said vessel, a pipe having guided movement in the receptacle and provided with a drain-cock exteriorly of the receptacle, said pipe passing through the float and being rigid therewith, the uppermost end of the pipe being bent downwardly above the float, and the pipe having within the float openings in the upper and lower part thereof, and a liquid-supply valve controlled by the sliding movement of said pipe.

3. A carbonating apparatus, comprising a receptacle provided with an inlet for the liquid to be carbonated, a float located in said vessel, a pipe having sliding movement in the receptacle and provided with a drain-cock exteriorly of the receptacle, said pipe being rigid with the float and communicating with the lower part of the interior thereof to drain the same, the upper part of the receptacle being provided with a vent or gas-inlet, and a liquid-supply valve controlled by the movement of said pipe.

4. A carbonating apparatus, provided with a receptacle for receiving the carbonated liquid and connected with a gas-supply, and a hollow float in said receptacle and having an opening for filling the interior with gas, the float also having a stem extending to the outside of the vessel to control the valve for the water-supply, the stem being hollow and having a draining connection with the interior of the float, substantially as shown and described.

JOHN WALTER.

Witnesses:
JOHN A. STRAUSKY,
HOLSEY E. PHILLIPS.